US007669132B2

(12) United States Patent
Widddowson (10) Patent No.: US 7,669,132 B2
(45) Date of Patent: Feb. 23, 2010

(54) MATCHING A SLIDESHOW TO AN AUDIO TRACK

(75) Inventor: Simon Widdowson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 11/590,034

(22) Filed: Oct. 30, 2006

(65) Prior Publication Data
US 2008/0104494 A1  May 1, 2008

(51) Int. Cl.
G06F 3/00 (2006.01)
(52) U.S. Cl. .................. 715/732; 715/730; 715/731; 700/94
(58) Field of Classification Search ............... 715/730, 715/731, 732; 700/94
See application file for complete search history.

(56) References Cited

U.S. PATENT DOCUMENTS

| | | | | |
|---|---|---|---|---|
| 5,661,665 A * | 8/1997 | Glass et al. | ............... | 348/423.1 |
| 5,812,736 A * | 9/1998 | Anderson | ..................... | 386/96 |
| 5,880,788 A * | 3/1999 | Bregler | ........................ | 348/515 |
| 5,951,646 A * | 9/1999 | Brandon | ..................... | 709/231 |
| 6,639,649 B2 * | 10/2003 | Fredlund et al. | ............... | 352/12 |
| 6,728,753 B1 * | 4/2004 | Parasnis et al. | ............ | 709/203 |
| 6,804,295 B1 * | 10/2004 | Belknap | ................. | 375/240.01 |
| 6,975,994 B2 * | 12/2005 | Black et al. | .................. | 704/275 |
| 7,236,226 B2 * | 6/2007 | Hung et al. | ..................... | 352/12 |
| 7,301,092 B1 * | 11/2007 | McNally et al. | ................ | 84/612 |
| 2002/0038299 A1 * | 3/2002 | Zernik et al. | ..................... | 707/3 |
| 2002/0059342 A1 * | 5/2002 | Gupta et al. | ................. | 707/512 |
| 2002/0140724 A1 * | 10/2002 | Qureshi et al. | .............. | 345/730 |
| 2002/0143978 A1 * | 10/2002 | Kuramochi et al. | ......... | 709/231 |
| 2003/0025878 A1 * | 2/2003 | Fredlund et al. | ............... | 352/1 |
| 2003/0085913 A1 * | 5/2003 | Ahmad et al. | ............... | 345/730 |
| 2003/0090506 A1 * | 5/2003 | Moore et al. | ................ | 345/730 |
| 2004/0054542 A1 * | 3/2004 | Foote et al. | ................ | 704/500 |
| 2004/0095379 A1 * | 5/2004 | Chang et al. | ................ | 345/727 |
| 2004/0114904 A1 * | 6/2004 | Sun et al. | ....................... | 386/46 |
| 2004/0122539 A1 * | 6/2004 | Ainsworth | .................... | 700/94 |
| 2004/0125126 A1 * | 7/2004 | Egawa et al. | ................ | 345/716 |
| 2004/0125128 A1 * | 7/2004 | Chang et al. | ................ | 345/730 |
| 2005/0149969 A1 * | 7/2005 | Kumar et al. | ................. | 725/40 |
| 2005/0149970 A1 * | 7/2005 | Fairhurst et al. | .............. | 725/47 |
| 2005/0154679 A1 * | 7/2005 | Bielak | .......................... | 705/59 |
| 2005/0182503 A1 * | 8/2005 | Lin et al. | ...................... | 700/94 |
| 2005/0190415 A1 * | 9/2005 | Ueda | .......................... | 358/505 |
| 2005/0211072 A1 * | 9/2005 | Lu et al. | ........................ | 84/612 |
| 2005/0275805 A1 * | 12/2005 | Lin et al. | ...................... | 352/12 |
| 2005/0289466 A1 * | 12/2005 | Chen | .......................... | 715/731 |
| 2006/0056796 A1 * | 3/2006 | Nishizawa et al. | ............. | 386/3 |
| 2006/0075348 A1 * | 4/2006 | Xu et al. | ..................... | 715/730 |

(Continued)

OTHER PUBLICATIONS

Scheirer, "Tempo and beat analysis of acoustic musical signals", Acoust. Soc. Am. 103(1); Jan. 1998.*

Primary Examiner—Weilun Lo
Assistant Examiner—Tuyetlien T Tran (57) ABSTRACT

In a method for a matching a slideshow with an audio track, a slideshow is received. The slideshow comprises a timebase defining display times for slides of the slideshow. An audio track is received. The audio track is utilized to warp the timebase such that a display time for at least one of the slides is altered to increase a correlation between the display time and an intensity of a portion of the audio track.

7 Claims, 10 Drawing Sheets

U.S. PATENT DOCUMENTS

2006/0127054 A1* 6/2006 Matsuyama ................. 386/96
2006/0187331 A1* 8/2006 Watanabe et al. ...... 348/333.01
2006/0265643 A1* 11/2006 Saft et al. .................. 715/517
2007/0011625 A1* 1/2007 Yan ........................... 715/818
2007/0016864 A1* 1/2007 Kummerli et al. ........... 715/716
2007/0094251 A1* 4/2007 Lu et al. ....................... 707/5

* cited by examiner

RECEIVING A SLIDESHOW, WHEREIN THE SLIDESHOW COMPRISES A TIMEBASE DEFINING DISPLAY TIMES FOR SLIDES OF THE SLIDESHOW.
310

RECEIVING AN AUDIO TRACK.
320

UTILIZING THE AUDIO TRACK TO WARP THE TIMEBASE, SUCH THAT A DISPLAY TIME FOR AT LEAST ONE OF THE SLIDES IS ALTERED TO INCREASE A CORRELATION BETWEEN THE DISPLAY TIME AND AN INTENSITY OF A PORTION OF THE AUDIO TRACK.
330

MATCHING A SLIDESHOW TO AN AUDIO TRACK

TECHNICAL FIELD

Embodiments of the present technology relate to slideshow creation. More specifically, embodiments of the present technology relate to a technology for matching a slideshow to an audio track.

BACKGROUND

With the rapid rise in use of digital cameras and personal computers, the need to display digital images and other digital media content in an attractive and enjoyable manner is becoming increasingly prevalent. Slideshows are one way to display digital images and digital media content and satisfy this need. However, slideshows that merely flash slides on a screen can be boring. To increase the interest, some persons configure their slideshows to play simultaneously with an audio track.

Automated methods for adding an audio track to a slideshow are limited. In one instance, an automated method merely plays an audio track at the same time as a slideshow. A more advanced approach may also loop the audio track if it is not of sufficient length to last for the entire slideshow or else scale the overall length of the audio track to the length of the slideshow. However, these automated approaches provide no correlation between the intensity of the slideshow and the intensity of the audio track, and thus generally produce unacceptable results with regard to matching the slideshow to the audio track in a similar fashion to how a movie score is matched to a movie.

Currently, manual manipulation is the best way, if not the only way, to match a slideshow to an audio track in a similar fashion to the way a soundtrack matches the intensity of a movie. Through manual manipulation, a particular slide or set of slides can be caused to display for more time during a less intense or slower portion of an audio track. Likewise, through manual manipulation, a particular slide or set of slides can be caused to display for less time during a more intense or faster portion of the audio track. This type of manual manipulation can deliver a good result as far as matching a slideshow to an audio track, but it is tedious, time consuming, and may require a great deal of skill.

The prevalence of digital images and media content is increasing, as is the use of slideshows. However, as described, existing methods for matching a slideshow to an audio track are tedious, time consuming, take a great deal of skill, or else deliver poor results.

BRIEF DESCRIPTION OF THE DRAWINGS

The accompanying drawings, which are incorporated in and form a part of this specification, illustrate embodiments of the present technology for matching a slideshow to an audio track and, together with the description, serve to explain principles discussed below.

The drawings referred to in this description should not be understood as being drawn to scale unless specifically noted.

DETAILED DESCRIPTION

Reference will now be made in detail to embodiments of the present technology for matching a slideshow to an audio track, examples of which are illustrated in the accompanying drawings. While the present technology is described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims. Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present technology.

Unless specifically stated otherwise as apparent from the following discussions, it is appreciated that throughout the present detailed description, discussions utilizing terms such as "receiving", "utilizing", "determining", "adding", "displaying", "generating", "supplying", "warping", "rendering", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Example Computer System Environment

Figure 1:
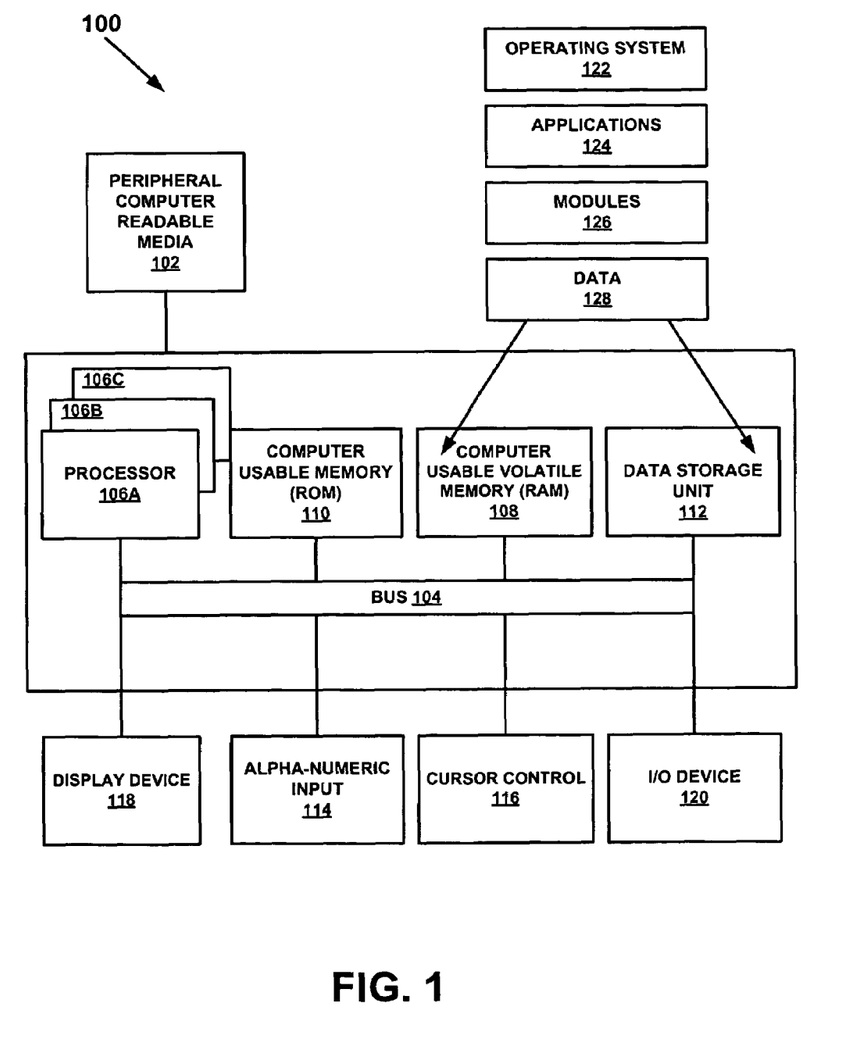
FIG. 1 is a diagram of an example computer system used in accordance with embodiments of the present technology.

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, digital cameras, multimedia consoles, multimedia handheld devices, and the like. As shown in FIG. 1, computer system 100 of FIG. 1 is well adapted to having peripheral computer readable/useable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B; and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108 and/or memory areas within data storage unit 112.

Slideshow Audio Track Matching System

Figure 2:
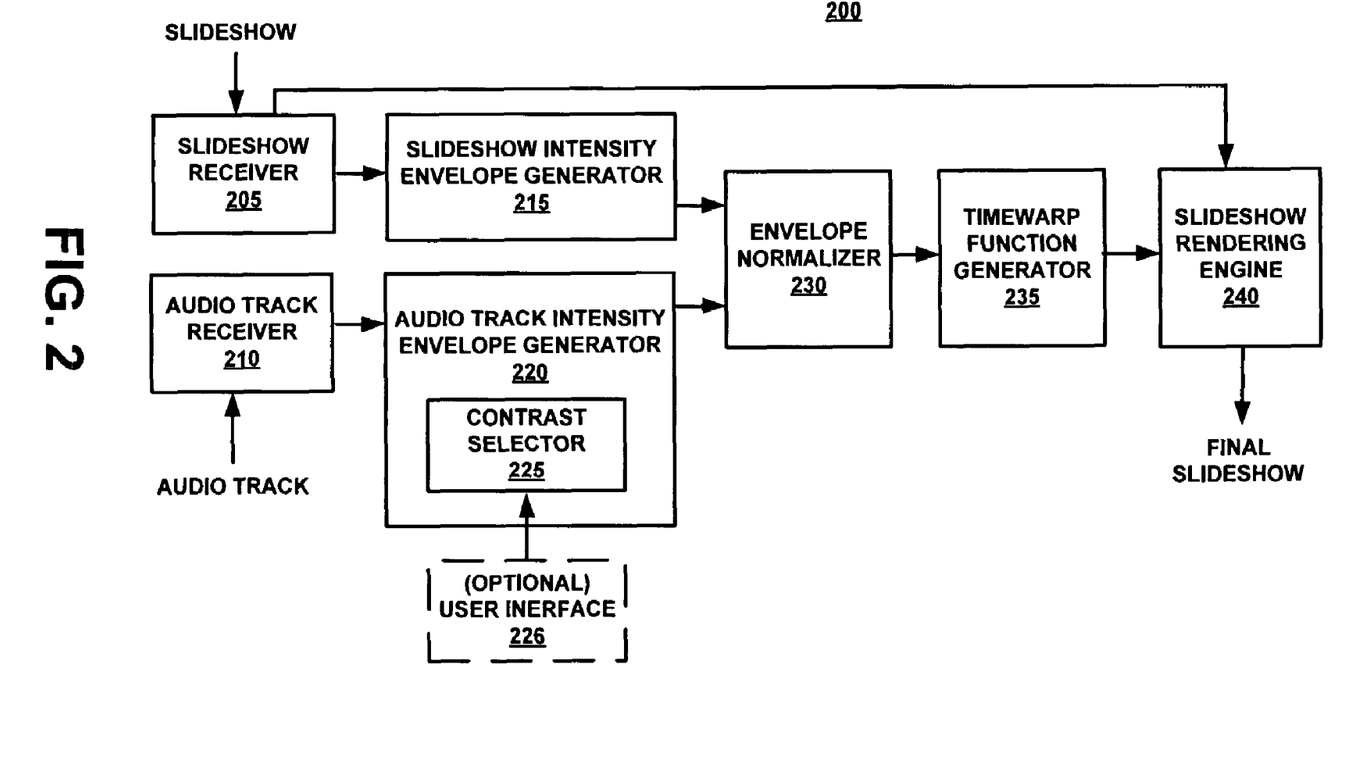
FIG. 2 is a block diagram of a slideshow audio track matching system, according to an embodiment.

With reference now to FIG. 2, a block diagram is shown of a slideshow audio track matching system 200 which matches the intensity of a slideshow to the intensity of an audio track. It is appreciated that slideshows referred to herein are comprised of digital images, clip art, text, and/or other visible digital or digitized media. The following discussion will begin with a description of the structure system 200. This discussion will then be followed by a discussion of example methods of operation of system 200 and portions thereof.

Structure of an Example Slideshow Audio Track Matching System

Still referring to FIG. 2, slideshow audio track matching system 200 is comprised of a slideshow receiver 205, an audio track receiver 210, a slideshow intensity envelope generator 215, an audio track intensity envelope generator 220, a contrast selector 225, an optional user interface 226, an envelope normalizer 230, a timewarp function generator 235, and a slideshow rendering engine 240. Although shown as being part of system 200 for purposes of clarity, it is appreciated that in some embodiments, one or both of slideshow intensity envelope generator 215 and audio track intensity envelope generator 220 may be implemented external to system 200, with inputs simply provided to envelope normalizer 230 as required. For example, in one such embodiment where audio track intensity envelope generator 220 is an external component to system 200, audio track receiver 210, contrast selector 225, and optional user interface 226, may also be implemented as external components.

Slideshow receiver 205 is coupled to slideshow intensity envelope generator 215 and slideshow rendering engine 240. Audio track receiver 210 is coupled to audio track intensity envelope generator 220. Audio track intensity envelope generator 220 also comprises contrast selector 225 which is coupled with optional user interface 226 (when present). Slideshow intensity envelope generator 215 and audio track intensity envelope generator 220 are coupled to envelope normalizer 230. Envelope normalizer 230 and slideshow rendering engine 240 are coupled with timewarp function generator 235.

In system 200, slideshow receiver 205 receives a pre-rendered slideshow for matching to an audio track. The pre-rendered slideshow is comprised of one or more digital images or visible digital media which make up one or more slides. Slideshow receiver 205 supplies the slideshow, or portion thereof, to slideshow intensity envelope generator 215 as required. Similarly, slideshow receiver 205 supplies the slideshow, or portion thereof, to slideshow rendering engine 240 as required. Although shown as a separate component, it is appreciated that the functions of slideshow receiver 205 may be incorporated in one or more other components, such as slideshow intensity envelope generator 215 and slideshow rendering engine 240.

Audio track receiver 210 receives an audio track, for example, in a digital audio format. Audio track receiver 210 supplies the audio track, or a portion thereof, to audio track intensity envelope generator 220 as required. Although shown as a separate component, it is appreciated that the functions of audio track receiver 210 may be incorporated into another component, such as audio track intensity envelope generator 220.

In one embodiment, slideshow intensity envelope generator 215 generates a slideshow intensity envelope from a slideshow provided by slideshow receive 205. In some embodiments, the slideshow intensity envelope information may be generated external to system 200 and provided as an input as to envelope normalizer as required. In such an embodiment, slideshow intensity envelope generator 215 may by implemented external to system 200. Additionally, in such an embodiment, slideshow receiver 205 may also be implemented external system 200.

In one embodiment, audio track intensity envelope generator 220 generates an audio intensity envelope from an audio track supplied by audio track receiver 210. In some embodiments, the audio intensity envelope information may be generated external to system 200 and provided as an input as to envelope normalizer as required. In such an embodiment, audio track intensity envelope generator 220 may by implemented external to system 200. Additionally, in such an embodiment, audio track receiver 210, contrast selector 225, and/or user input 226 may also be implemented external system 200.

In one embodiment, contrast selector 225 is configured as a portion of audio track intensity envelope generator 220. It is appreciated that in some embodiments, contrast selector 225 may be implemented apart from audio track intensity envelope generator 220. In one embodiment, contrast selector 225 adds an offset to the audio intensity envelope to select a contrast ratio between a highest intensity in the audio intensity envelope and a lowest intensity in the audio intensity envelope. In one embodiment, the contrast ratio is selected by a user via optional user interface 226.

In one embodiment, envelope normalizer 230 determines a normalized intensity envelope from a slideshow intensity envelope and an audio intensity envelope.

In one embodiment, timewarp function generator 235 generates a timewarp function from the normalized intensity envelope. The timewarp function correlates the slideshow timebase with the audio intensity envelope of the audio track supplied by audio track receiver 210.

In one embodiment, slideshow rendering engine 240 utilizes the timewarp function to warp the timebase of the slideshow received by slideshow receiver 205 such that a display time for at least one of the slides in the slideshow is altered to increase a correlation between the display time and an intensity of a portion of the audio track. This can comprise increasing or decreasing the length of the display time of the slide.

Example Methods of Operation

Figure 3:
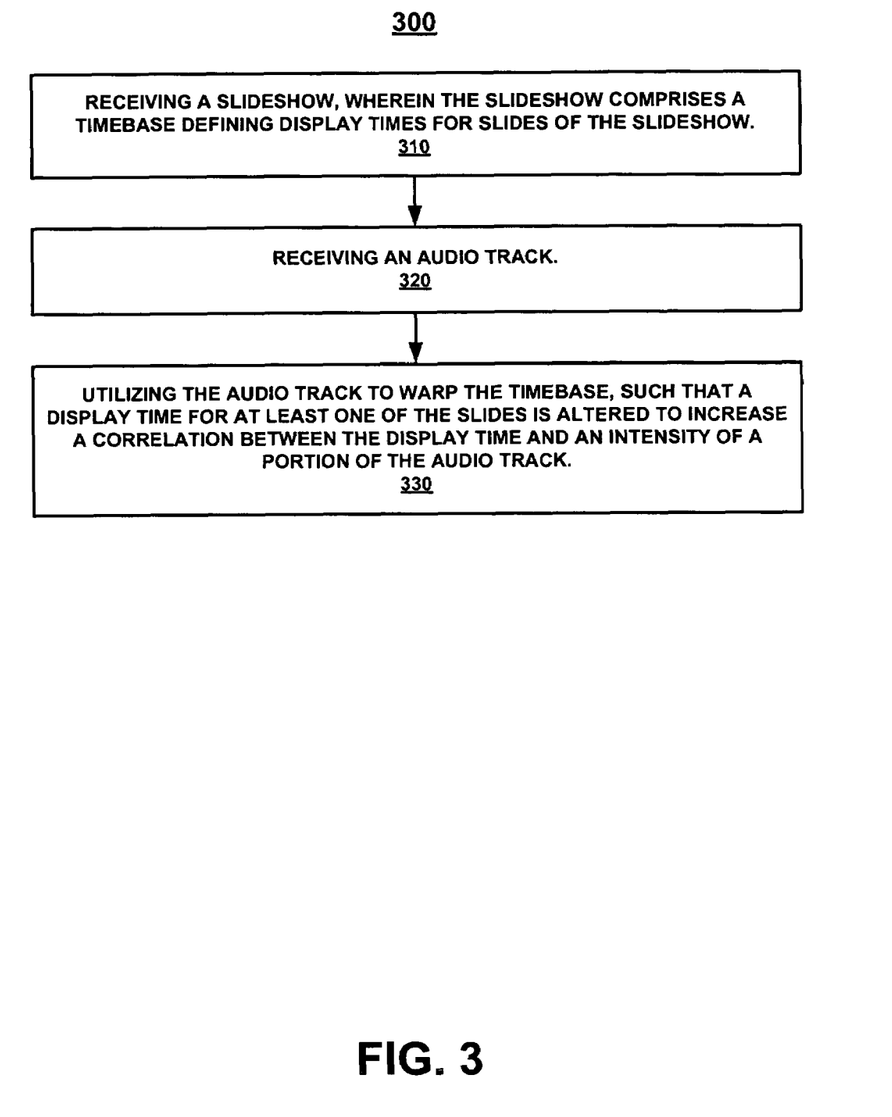
FIG. 3 is a flow diagram of a method for matching a slideshow with an audio track, according to various embodiments.
Figure 10:
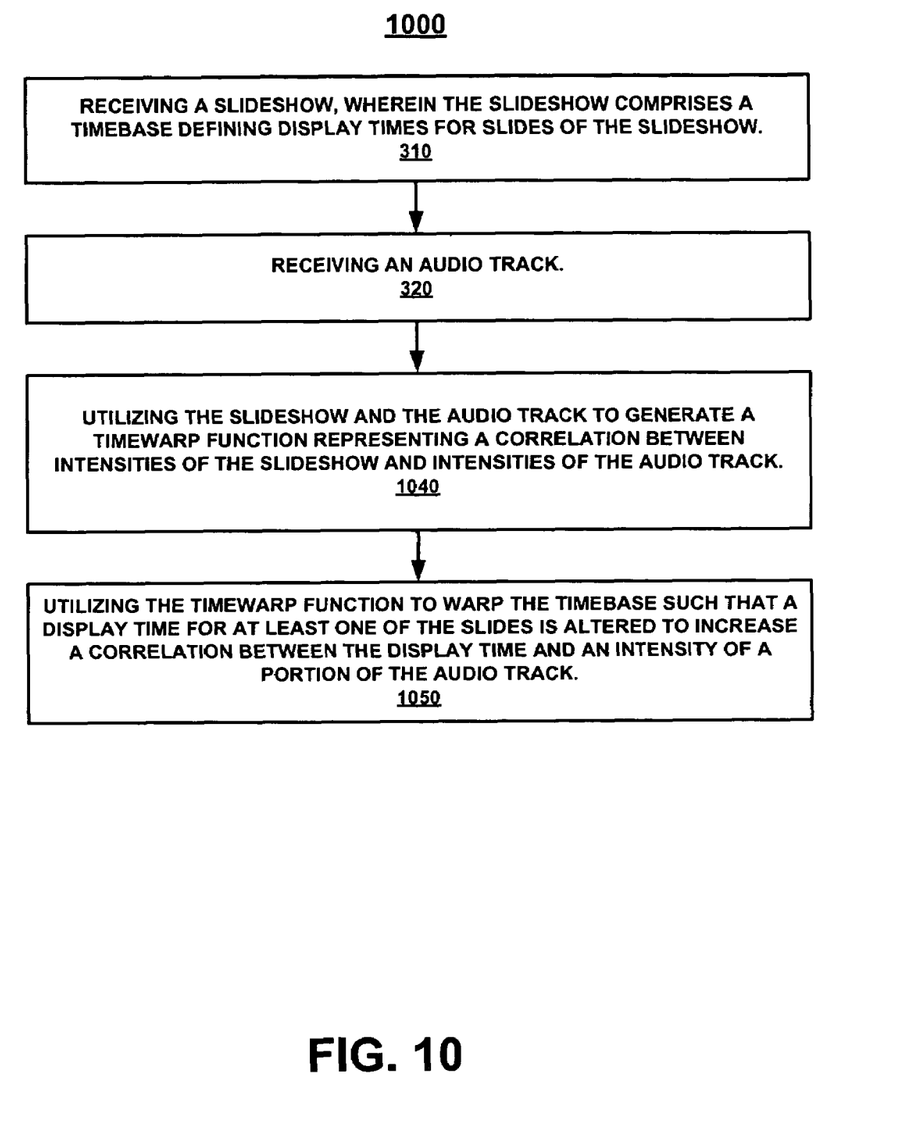
FIG. 10 is a flow diagram of a method for warping a timebase of a slideshow, according to an embodiment.

The following discussion sets forth in detail the operation of present technology through description of example embodiments. With reference to FIGS. 3 and 10, flow diagrams 300 and 1000 each illustrate example steps used by various embodiments of the present technology. Flow diagrams 300 and 1000 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300 and 1000, such steps are examples. That is, embodiments are well suited to performing various other steps or variations of the steps recited in flow diagrams 300 and 1000. It is appreciated that the steps in flow diagrams 300 and 1000 may be performed in an order different than presented, and that not all of the steps in flow diagrams 300 and 1000 may be performed.

Example Method for Matching a Slideshow with an Audio Track

FIG. 3 is a flow diagram 300 of a method for matching a slideshow with an audio track, in accordance with an embodiment of the present technology. Description of flow diagram 300 is facilitated by reference to elements shown in FIG. 2 and FIGS. 4-9.

At 310 of flow diagram 300, in one embodiment, the method receives a slideshow. In one embodiment, slideshow receiver 205 receives the slideshow. In various embodiments, the received slideshow is pre-defined. That is, it is pre-built of digital images, charts, clipart, text, and other visible digital media. The slideshow has a timebase which defines the display times for each of the slides in the slideshow. In some embodiments the timebase also defines transition times, such as transition times between slides and/or transition times within slides. The timebase may specify a fixed display time for all slides or may vary the display times for some or all slides. For example, the timebase of the received slideshow may comprise a flat timebase that defines identical display periods for all slides of the slideshow. For instance, such a flat timebase may specify that each slide is displayed for an identical time, such as three seconds, before the transition to the display of the next slide in the slideshow. In another example, the timebase of the received slideshow defines varied display times for slides of the slideshow. For instance, a varied timebase may specify that one image is to be displayed for three seconds, while another is displayed for five seconds, and yet another is displayed for four seconds.

At 320 of flow diagram 300, in one embodiment, the method receives an audio track. In one embodiment, audio track receiver 210 receives the audio track. For example, in one embodiment, audio track receiver 210 receives a pre-selected audio track in a digital audio format. In various embodiments the audio track may comprise music, dialogue, sounds, or the like in any of a variety of known formats.

At 330 of flow diagram 300, in one embodiment, the method utilizes the audio track to warp the timebase of the slideshow. The timebase is warped such that a display time for at least one of the slides in the slideshow is altered to increase a correlation between the display time and an intensity of a portion of the audio track. In one embodiment, utilizing the audio track to warp the timebase comprises slowing the timebase, such that a display time for at least one of the slides is extended to correlate to a lower intensity portion of the audio track. In one embodiment, utilizing the audio track to warp the timebase comprises speeding the timebase, such that a display time for at least one of the slides is shortened to correlate to a higher intensity portion of the audio track. It is appreciated that the audio track is extensively analyzed and utilized, as described herein, to derive information for performing the timewarping and correlating effects performed upon the timebase of the slideshow.

In one embodiment utilizing the audio track to warp the timebase of the slideshow comprise utilizing the audio track to generate an audio intensity envelope, and then further utilizing the audio intensity envelope to warp the timebase of the slideshow. As will be seen, in some embodiments, this comprises utilizing the audio intensity envelope to slow the timebase when an intensity value of a portion of the audio intensity envelope is low in comparison to other intensity values of the audio intensity envelope. Likewise, in some embodiments, this comprises utilizing the audio intensity envelope to accelerate the timebase when an intensity value of a portion of the audio intensity envelope is high in comparison to other intensity values of the audio intensity envelope.

Audio track intensity envelope generator 220 generates an audio intensity envelope from the audio track supplied by audio track receiver 210. The audio intensity envelope may be generated in a variety of ways. For example, in one embodiment, audio track intensity envelope generator 220 generates a power spectral density representation of the audio track which indicates the intensity of the audio track at successive discrete intervals. In one embodiment, this can comprise, for example, audio track intensity envelope generator 220 integrating the audio output of the audio track over a frequency range, such as 20 Hz to 20,000 Hz, at discrete intervals, such as once every 100 ms. Generation of such an audio intensity envelope from an audio track is known in the art. In other embodiments, audio track intensity envelope generator 220 generates an audio intensity which includes intensity detection of elements, such as: vocalist detection, tempo detection, and major/minor musical key recognition, among others.

The audio intensity envelope comprises a signal which varies in amplitude over time in synchronization with the variations of the intensity of the audio track. A high amplitude in the audio intensity envelope signal represents a high intensity at that period in time in the audio track. Likewise, a low amplitude in the audio intensity envelope signal represents a low intensity at that period in time in the audio track.

Figure 4:
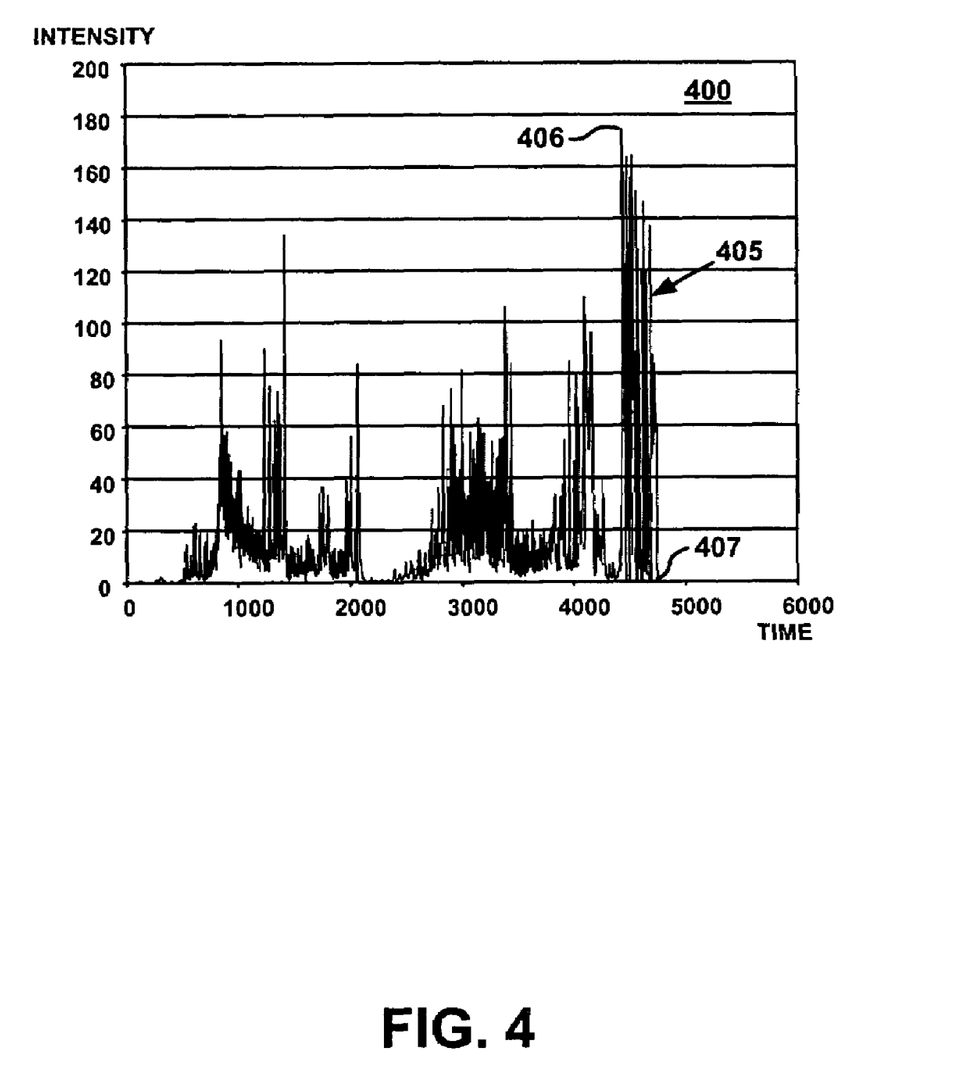
FIG. 4 is an example of an audio intensity envelope, according to an embodiment.

FIG. 4 shows a graph 400 of an example audio intensity envelope 405 which comprises a signal which varies in intensity over time. For purposes of example and not of limitation the audio track utilized to generate audio intensity envelope 405 may be understood to be a musical track. The time scale of graph 400 is 100 ms units. As can be seen from graph 400, the first half (0-2400 on the time axis) of the music track is generally less intense than the second half (2500-4800 on the time axis). This may be, for example, due to a slower tempo during the first half of the musical track.

In one embodiment, contrast selector 225 selects a ratio between the highest intensity and the lowest intensity in the audio intensity envelope produced by audio intensity envelope generator 220. This is useful, because in many cases the ratio between the highest intensity and the lowest intensity in the audio intensity envelope is very high or very low. For example, referring to FIG. 4, the low point 407 of intensity of audio intensity envelope 405 has an intensity value of approximately one or less. While the high point of intensity at point 406 has an intensity value of approximately 175. This ratio between the high point 406 and low point 407 is at least 175:1, if not higher.

If a very low intensity slideshow was matched to audio intensity envelope 405, it is possible that the some slides may be displayed up to 175 times longer than others, which is likely not desirable. To remedy this, in one embodiment, contrast selector 225 adds an appropriate amount of offset (positive or negative) to the audio intensity envelope to fix this ratio at a pre-selected or user selected ratio. Thus, in one embodiment, contrast selector 225 selects the contrast ratio by fixing the ratio between the highest and lowest intensities in an audio intensity envelope to a pre-selected or user selected value.

Figure 5:
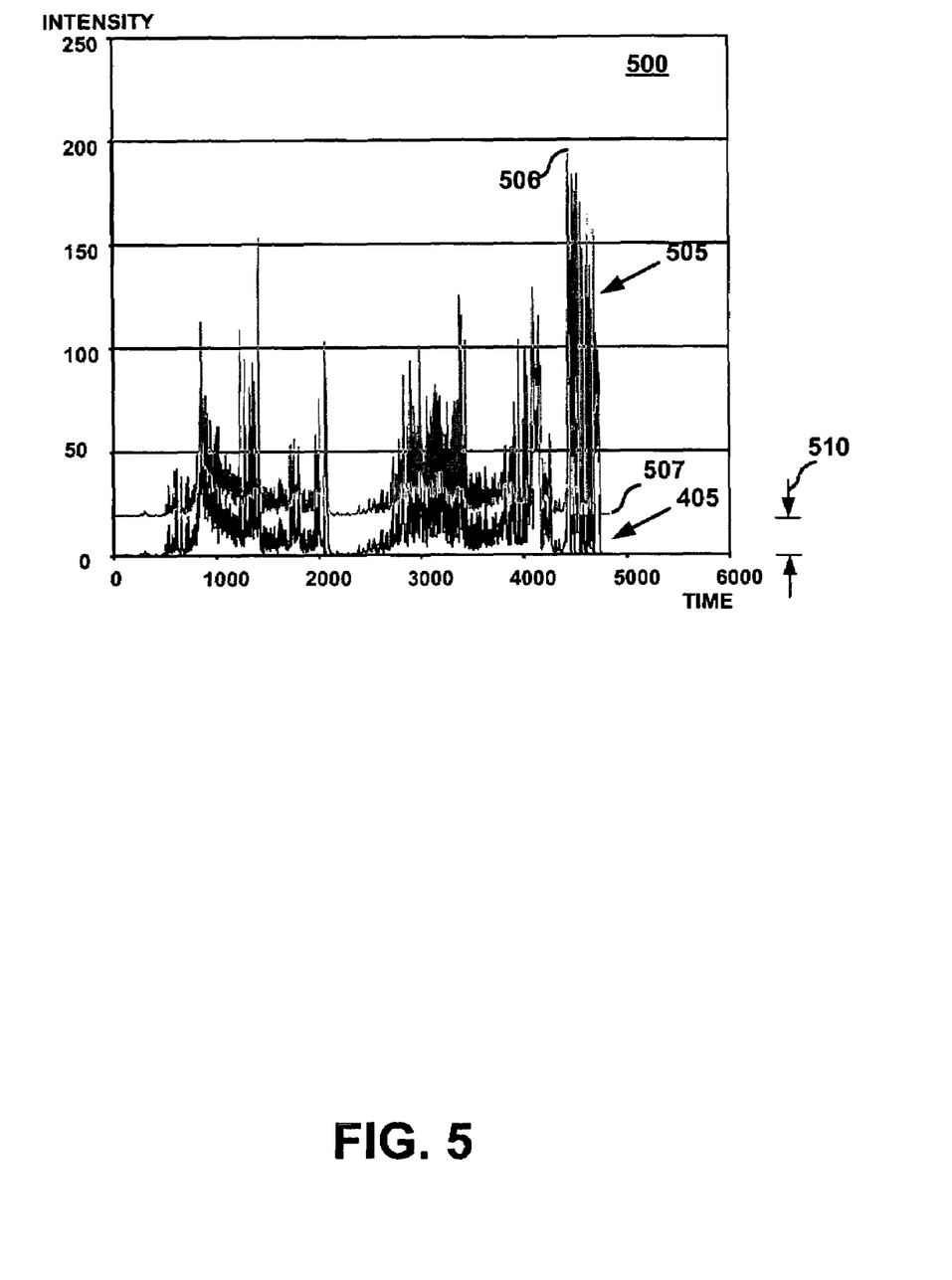
FIG. 5 is an example of a contrast modified audio intensity envelope, according to an embodiment.

FIG. 5 is an example of graph 500 of a contrast modified audio intensity envelope 505, according to an embodiment. In FIG. 5, a positive offset 510 of approximately twenty intensity units has been added to audio intensity envelope 405 to create contrast modified audio intensity envelope 505. The highest intensity value 506 of contrast modified audio intensity envelope 505 has an intensity value of approximately 195, while the lowest intensity value 507 has an intensity value of approximately 20. This provides contrast modified audio intensity envelope 505 with a contrast ratio of approximately 195:20, or a contrast value of approximately 9.75. If a very low intensity slideshow was matched to audio intensity envelope 505, some slides may be displayed up to 9.75 times longer than others, which is a more acceptable result.

Optional user interface 226 provides a means for a user to input a selected contrast, which contrast selector 225 uses to set the contrast ratio as described above. Following the previous example, a user could enter a contrast value of 9.75 via user interface 226, and in response, contrast selector 225 would fix the contrast of the audio intensity envelope at the selected contrast ratio of 9.75 by adding a positive offset of approximately 20 intensity units. Selecting a high contrast ratio such as 10 or 20 ensures that there will be noticeable differences, for example, in the display time periods of slides shown in conjunction with high intensity portions of the audio track versus slides shown in conjunction with low intensity portions of the audio track. Selecting a low contrast ratio such as 1.5 or 2 ensures that there will be only subtle differences, for example, in the display time periods of slides shown in conjunction with high intensity portions of the audio track versus slides shown in conjunction with low intensity portions of the audio track.

Figure 6:
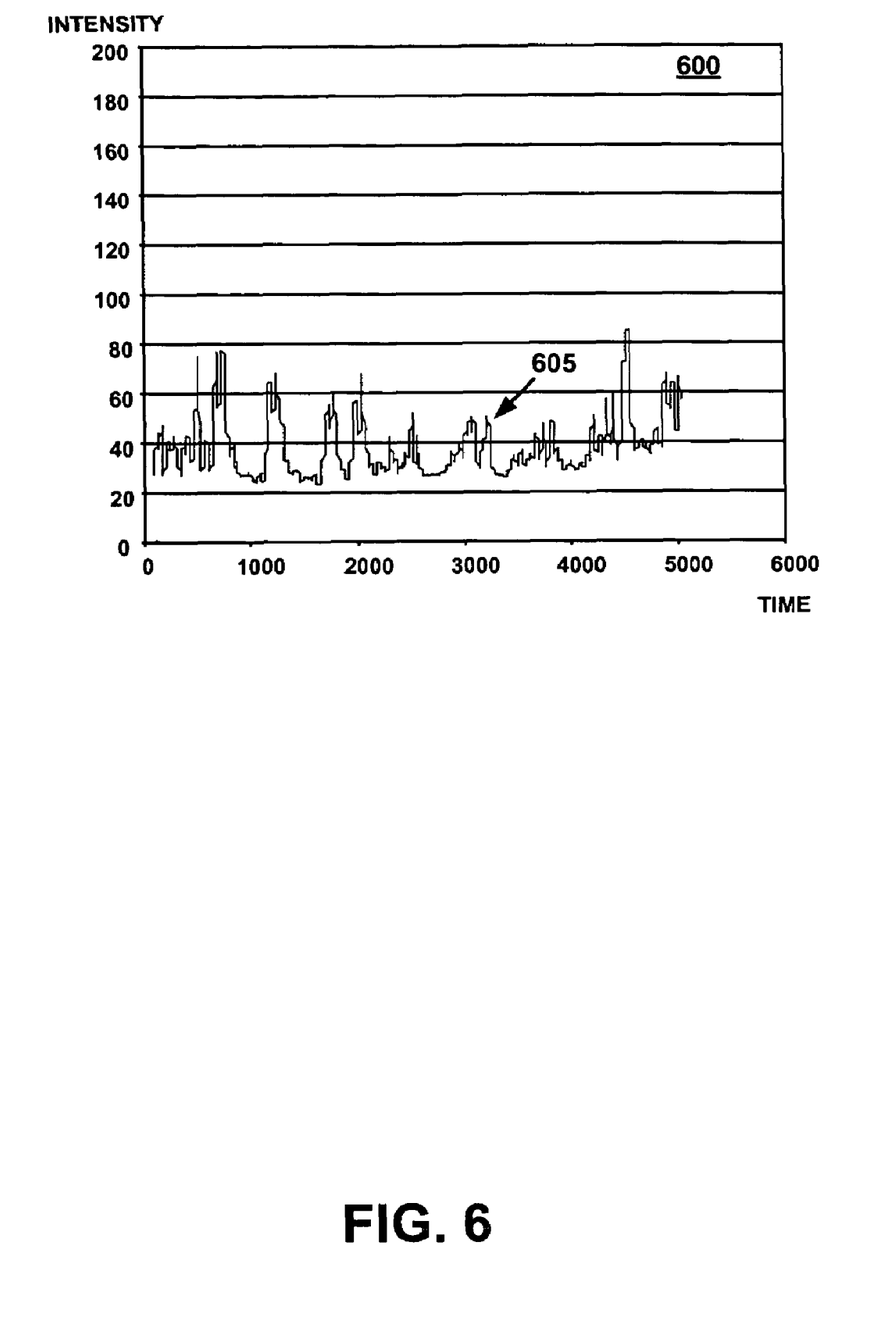
FIG. 6 is an example of a slideshow intensity envelope, according to an embodiment.

In one embodiment, utilizing the audio track to warp the time base of the slideshow also comprises utilizing the slideshow to generate a slideshow intensity envelope. Slideshow intensity envelope generator 215 generates a slideshow intensity envelope from a slideshow. Slideshow intensity envelope generator 215 may utilize a variety of intensity measures either alone or in combination to generate the slideshow intensity envelope. Some such measures, which may be used include: the number of images displayed per slide, the average amount of time a slide is displayed (in accordance with the slideshow timebase), and the amount of salient content displayed per slide. When generated from such factors, a slideshow intensity envelope will typically comprise a signal which varies in intensity over time. FIG. 6 is a graph 600 of one example of a slideshow intensity envelope 605 which varies over time, according to an embodiment.

Figure 7:
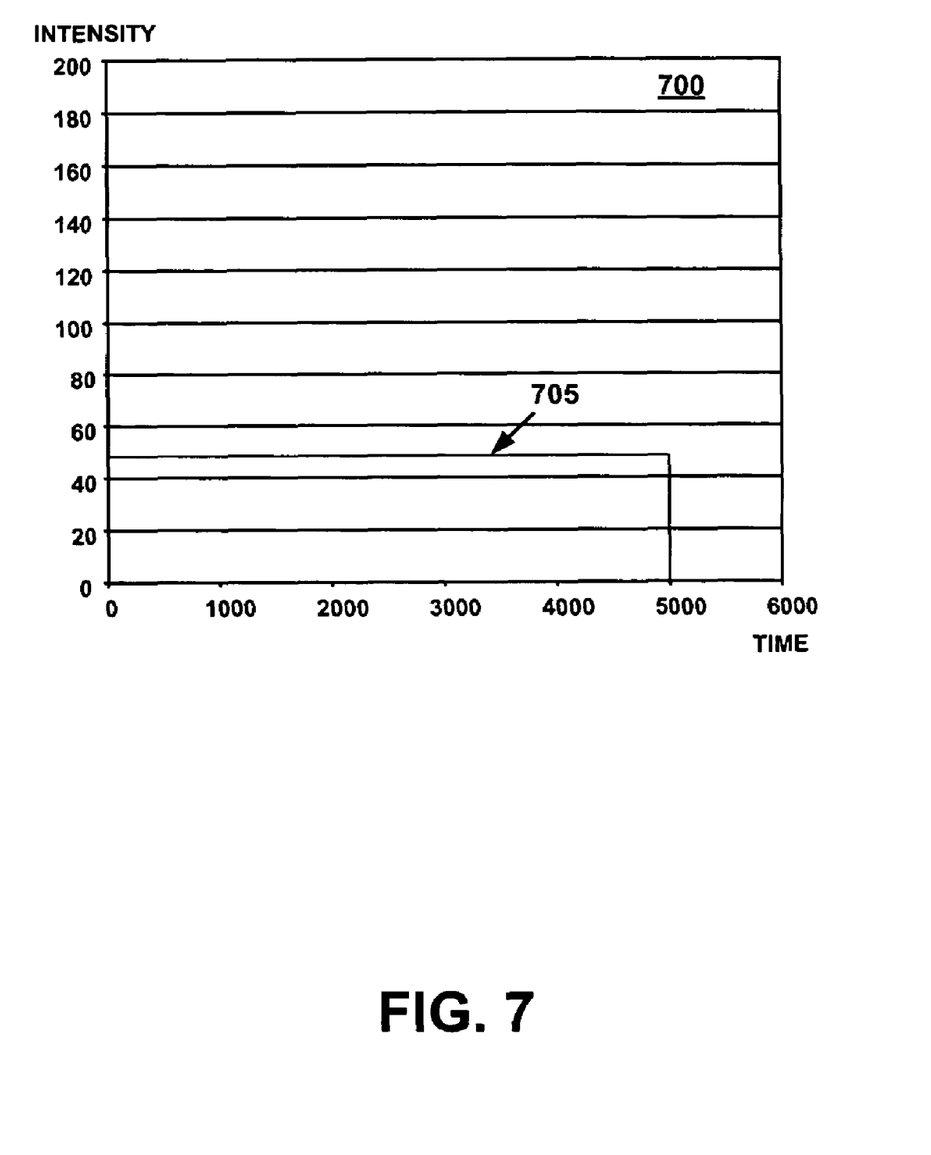
FIG. 7 is another example of a slideshow intensity envelope, according to an embodiment.

In some embodiments, slideshow intensity envelope generator 215 generates a slideshow intensity envelope that is fixed over time. For example, in one embodiment, a fixed slideshow intensity envelope is the default output of slideshow intensity envelope generator 215. This is also useful in embodiments where the slideshow intensity is difficult to measure. In another embodiment, a fixed slideshow intensity envelope is possible output when limited factors are evaluated for intensity. FIG. 7 is a graph 700 of one example of a slideshow intensity envelope 705 which is fixed over time, according to an embodiment.

In one embodiment, utilizing the audio track to warp the time base of the slideshow also comprises determining a normalized intensity envelope from the slideshow intensity envelope and the audio intensity envelope. Envelope normalizer 230 determines a normalized intensity envelope from a slideshow intensity envelope received from slideshow intensity envelope generator 215 and an audio intensity envelope received from audio track intensity envelope generator 220. In one embodiment, envelope normalizer 230 determines a normalized intensity envelope by finding a difference between like time segments of the slideshow intensity envelope and the audio intensity envelope, utilizing a technique such as histogram matching. The difference can be the result of either division or subtraction.

For example, in one embodiment the intensity value for a time period of the audio intensity envelope is subtracted from the intensity value for the like time period of the slideshow intensity envelope. Envelope normalizer 230 repeats such calculations for successive discrete periods of time, such as, for example once every 100 ms, to determine the normalized intensity envelope. If necessary, envelope normalizer 230 may truncate or loop the audio intensity envelope (and thus the audio track as well) to match the length of the slideshow intensity envelope.

The normalized intensity envelope will typically vary in intensity over time, much in the same way as audio intensity envelope 405 of FIG. 4 varies in intensity overtime. Where differences between the two intensity envelopes are large, large differences will occur in the normalized intensity envelope. As will be seen, such large differences will result in a large warping effect to the timebase of the slideshow. Likewise, where differences between the two intensity envelopes are small, small differences will occur in the normalized intensity envelope. As will be seen, such small differences will result in very little warping to the timebase of the slideshow.

In one embodiment, utilizing the audio track to warp the time base of the slideshow also comprises utilizing the normalized intensity envelope to generate a timewarp function with which to warp the timebase of the slideshow. Timewarp function generator 235 generates a timewarp function from the normalized intensity envelope supplied by envelope normalizer 230. The timewarp function is a cumulative representation of the normalized intensity envelope, and is used for correlating the slideshow timebase with the audio intensity envelope of the audio track. For example, the timewarp function constitutes a lookup table to translate from the "flat time" timebase at which events (such as slide transitions) occur in the original slideshow to the "warped time" of the final slideshow (the time at which the same events occur in a new slideshow output by slideshow rendering engine 240).

Figure 8:
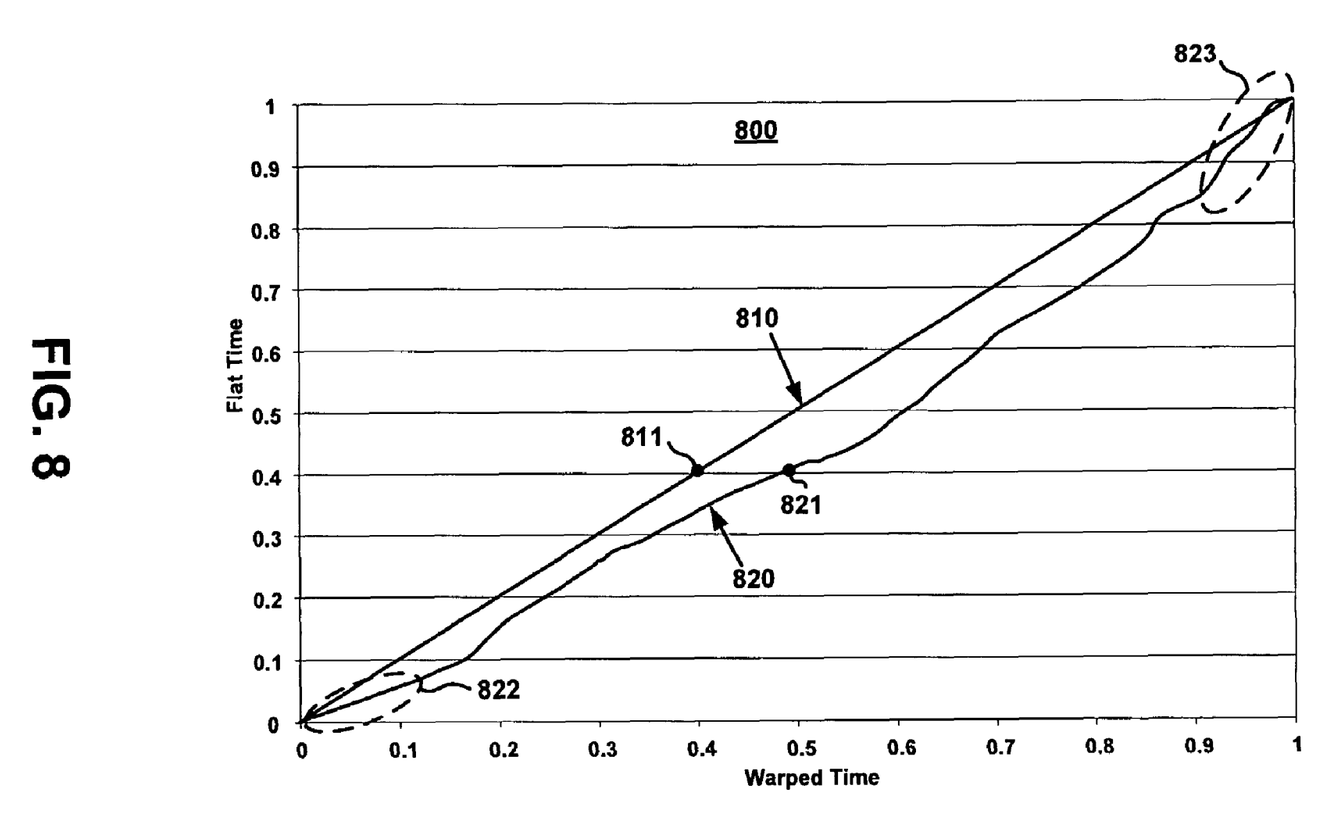
FIG. 8 is an example of a timewarp function, according to an embodiment.

In one embodiment, timewarp function generator 235 generates the timewarp function by determining a cumulative integral of the normalized intensity envelope over time. FIG. 8 shows a graph 800 of a timewarp function 820, according to an embodiment. In graph 800, straight line 810 represents an unwarped function for comparison. Timewarp function 820 represents a timewarp function calculated from a normalized intensity envelope which is generated from audio intensity envelope 505 (FIG. 5) and a flat slideshow intensity envelope such as slideshow intensity envelope 705 (FIG. 7). As can be seen, the initial slope of portion 822 of timewarp function 820 is fairly shallow, corresponding to the low intensity at the beginning of the music track (for example 0-800 on the time axis of graph 500). As a result, timewarp function 820 slows the flat time of the original timebase to correspond to the lower intensity of the music track.

This slowing is more evident by comparison of point 811 (which equates to 0.4 flat time and 0.4 warped time) with point 821 (which equates to 0.4 flat time but 0.5 warped time). Thus at point 821, only 40% of the slideshow has been displayed while 50% of the music track has been played.

During the second half, and especially near the end of the music track, the audio intensity increases. This is reflected by the increased slope of portion 823 of the timewarp function. Thus from point 821 onward to the end of timewarp function 820, the remaining 60% of the slideshow will be displayed while the remaining 50% of the music track is played. This means that the remaining 60% of the slides will be displayed at a faster rate than the first 40% of the slides in order to match the slideshow to the higher intensity of the second half of the music track.

In one embodiment, slideshow rendering engine 240 receives an unaltered version of the slideshow as an input. Slideshow rendering engine 240 also receives or accesses the timewarp function produced by timewarp function generator 235. In one embodiment, slideshow rendering engine 240 utilizes the timewarp function as a lookup table to warp the timebase of the slideshow such that a display time for a slide is altered to increase a correlation between the display time of the slide and a corresponding intensity of a portion of the audio track. This can comprise accelerating (shortening) the display time, for example to better correlate to a high intensity portion of the audio track. Likewise, this can comprise slowing (lengthening) the display time, for example to better correlate to a less intense portion of the audio track.

Referring again to FIG. 8 and timewarp function 820. Assume, for example, a case where the slideshow is comprised of 10 slides with a timebase specifying identical display times. The flat time axis corresponds to the original transition points between slides, while the warped time axis corresponds to the warped time transition points between slides. Timewarp function 820 provides the lookup table for transforming the flat time transition times to the warped time transition times. Thus, if slide number one of the slideshow is initially displayed at flat time "0", a transition to slide number two would have occurred at flat time "0.1", however, slideshow rending engine will cause this transition to occur at a warped time of approximately 1.75. This is substantially slower than the original timebase, due to use of the utilization of the intensity of the music track (through the process described above) to alter the original timebase to correlate to the lower intensity at the beginning of the music track.

Figure 9:
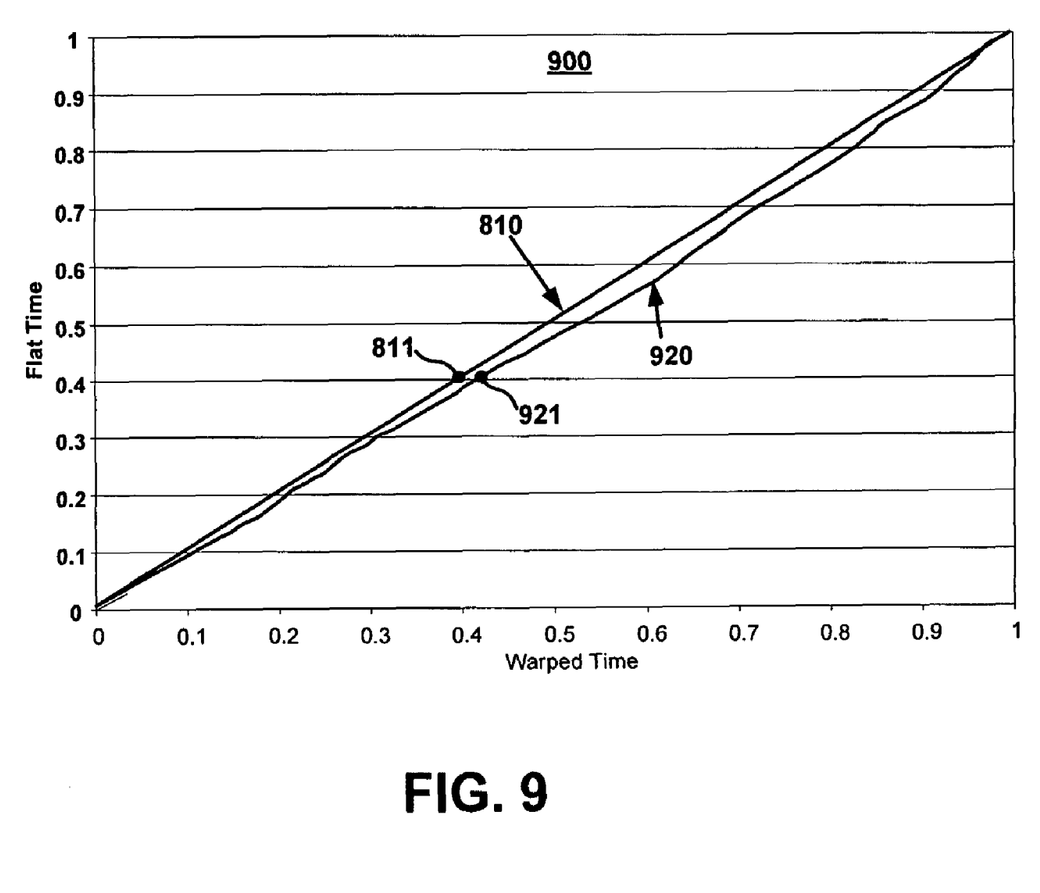
FIG. 9 is another example of a timewarp function, according to an embodiment.

FIG. 9 is another example of a graph 900 of a timewarp function 920, according to an embodiment. FIG. 9 is shown for comparative purposes. In FIG. 9, line 810 and point 811 are the same as in FIG. 8. Additionally, timewarp function 920 has been generated from the same audio track and audio intensity envelope as timewarp function 820, with one exception. In FIG. 8, the timewarp function was generated with a contrast ratio of approximately 10 (9.75). In FIG. 9, timewarp function 820 has been generated from an audio intensity envelope with a contrast of approximately 2. This results in much less warping of the timebase to correlate to the audio track. For example, point 921 is at 0.4 flat time and approximately 0.42 warped time. Thus, the reduction in contrast results in a substantial reduction in warping to the slideshow timebase, as compared to point 821 of FIG. 8.

Example Method for Warping a Timebase of a Slideshow

FIG. 10 is a flow diagram 1000 of a method of warping a timebase of a slideshow, in accordance with an embodiment of the present technology. Description of flow diagram 1000 is facilitated by reference to elements shown in FIGS. 4-9 and flow diagram 300 of FIG. 3.

At 310 of flow diagram 1000, in one embodiment, the method receives a slideshow. The slideshow has a timebase that defines display times for slides of the slideshow. Reference is made to the description of step 310 of flow diagram 300, which is the same as step 310 of flow diagram 1000. In the interests of brevity and clarity step 310 will not be described again herein.

At 320 of flow diagram 1000, in one embodiment, the method receives an audio track. Reference is made to the description of step 320 of flow diagram 300, which is the same as step 320 of flow diagram 1000. In the interests of brevity and clarity step 320 will not be described again herein.

At 1040 of flow diagram 1000, in one embodiment, the method utilizes the slideshow and the audio track to generate a timewarp function representing a correlation between intensities of the slideshow and intensities of the audio track. In one embodiment this comprises audio track intensity envelope generator 220 utilizing the audio track to generate an audio intensity envelope. This is consistent with previous description of the operation and use of audio track intensity envelope generator 220.

In one embodiment, user interface 226 is used by a user to determine a contrast ratio between a highest intensity in the audio intensity envelope and a lowest intensity in the audio intensity envelope. The user input is directed to contrast selector 225 which selects the contrast of the audio intensity envelope according to the user input. This is consistent with the manner of selecting a contrast that has been previously described herein.

In one embodiment, as previously described, slideshow intensity envelope generator 215 is utilized to generate a slideshow intensity envelope of the received slideshow. This is consistent with previous description of the operation of slideshow intensity envelope generator 215.

In one embodiment, utilizing the slideshow and the audio track to generate a timewarp function representing a correlation between intensities of the slideshow and intensities of the audio track also comprises envelope normalizer 230 determining a normalized intensity envelope from the slideshow intensity envelope and the audio intensity envelope. This is consistent with previous description of envelope normalizer 230.

In one embodiment, utilizing the slideshow and the audio track to generate a timewarp function representing a correlation between intensities of the slideshow and intensities of the audio track also comprises timewarp function generator 235 utilizing the normalized intensity envelope to generate the timewarp function. The operation of timewarp function generator 235 to generate the timewarp function from a normalized intensity envelope is consistent with previous description of this operation.

At 1050 of flow diagram 1000, in one embodiment, the method utilizes the timewarp function to warp the timebase such that a display time for at least one of the slides in the slideshow is altered to increase a correlation between the display time and an intensity of a portion of the audio track.

In one embodiment, this comprises slideshow rendering engine 240 warping the timebase of the slideshow according to a timewarp function. This is consistent with previous description of the operation of slideshow rendering engine 240.

In one embodiment, slideshow rendering engine 240 uses the timewarp function to slow the timebase of the slideshow such that a display time for at least one of the slides is extended to correlate to a lower intensity portion of the audio track. Using timewarp function 820 of FIG. 8 as an example, slideshow rendering engine 240 slows the timebase during portion 822 of timewarp function 820. In one embodiment, this causes the display time of slides to be extended to correspond to a lower intensity portion of the audio track which was used to generate timewarp function 820. Similarly, in one embodiment, this also slows down intra-slide transitions.

In one embodiment, slideshow rendering engine 240 uses the timewarp function to accelerate the timebase of the slideshow such that a display time for at least one of the slides is shortened to correlate to a higher intensity portion of the audio track. Using timewarp function 820 of FIG. 8 as an example, slideshow rendering engine 240 accelerates the timebase during section 823 of timewarp function 820. In one embodiment, this causes the display time of slides to be shortened to correspond to a higher intensity portion of the audio track which was used to generate timewarp function 820. Similarly, in one embodiment, this also accelerates intra-slide transitions.

Although the subject matter of the present technology has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for matching a slideshow with an audio track, said method comprising:
    receiving a slideshow, wherein said slideshow comprises a timebase defining display times for slides of said slideshow;
    receiving an audio track;
    utilizing said audio track to generate an audio intensity envelope; and
    utilizing said audio track to warp said timebase, such that a display time for at least one of said slides is altered to increase a correlation between said display time and an intensity of a portion of said audio track, wherein said utilizing said audio track to warp said timebase comprises:
        utilizing said slideshow to generate a slideshow intensity envelope;
        determining a normalized intensity envelope from said slideshow intensity envelope and said audio intensity envelope; and
        utilizing said normalized intensity envelope to generate a timewarp function with which to warp said timebase.

2. The method as recited in claim 1, wherein said receiving a slideshow, wherein said slideshow comprises a timebase defining display times for slides of said slideshow comprises:
    receiving a slideshow, wherein said slideshow comprises a flat timebase defining identical display times for slides of said slideshow.

3. The method as recited in claim 1, wherein said receiving a slideshow, wherein said slideshow comprises a timebase defining display times for slides of said slideshow comprises:
    receiving a slideshow, wherein said slideshow comprises a timebase defining varied display times for slides of said slideshow.

4. The method as recited in claim 1, wherein said utilizing said audio track to warp said timebase comprises:
    utilizing said audio track to slow said timebase, such that a display time for said at least one of said slides is extended to correlate to a lower intensity portion of said audio track.

5. The method as recited in claim 1, wherein said utilizing said audio track to warp said timebase comprises:
    utilizing said audio track to speed said timebase, such that a display time for said at least one of said slides is shortened to correlate to a intensity portion of said audio track.

6. The method as recited in claim 1, wherein said utilizing said audio track to warp said timebase, such that a display time for at least one of said slides is altered to increase a correlation between said display time and an intensity of a portion of said audio track comprises:

utilizing said audio intensity envelope to slow said timebase when an intensity value of a portion of said audio intensity envelope is low in comparison to other intensity values of said audio intensity envelope.

7. The method as recited in claim 1, wherein said utilizing said audio track to warp said timebase, such that a display time for at least one of said slides is altered to increase a correlation between said display time and an intensity of a portion of said audio track comprises:

utilizing said audio intensity envelope to accelerate said timebase when an intensity value of a portion of said audio intensity envelope is high in comparison to other intensity values of said audio intensity envelope.

* * * * *